United States Patent [19]

Genchev et al.

[11] Patent Number: 4,765,233
[45] Date of Patent: Aug. 23, 1988

[54] APPARATUS FOR VACUUM PEELING OF FRUITS AND VEGETABLES

[75] Inventors: Lyubomir N. Genchev; Iliya C. Kafedjiev; Kostadin S. Klyamov; Stefan G. Atanasov, all of Sofia, Bulgaria

[73] Assignee: S O "Bulgarplod", Sofia, Bulgaria

[21] Appl. No.: 40,516

[22] Filed: Apr. 17, 1987

[30] Foreign Application Priority Data

Apr. 17, 1986 [BG] Bulgaria ................... 74553

[51] Int. Cl.⁴ .............................................. A23N 7/00
[52] U.S. Cl. ...................................... 99/472; 99/516; 99/584
[58] Field of Search ................. 99/472, 467, 469, 470, 99/483, 516, 584, 540, 567, 537; 426/481, 482, 509

[56] References Cited

U.S. PATENT DOCUMENTS

| | | | |
|---|---|---|---|
| 4,026,203 | 5/1977 | Levati | 99/472 |
| 4,092,910 | 6/1978 | Genchev et al. | 99/472 |
| 4,315,039 | 2/1982 | Levati | 426/482 |
| 4,437,398 | 3/1984 | Savi | 99/584 X |
| 4,524,681 | 6/1985 | Harris et al. | 99/584 X |
| 4,562,772 | 1/1986 | Battistini | 99/472 |

*Primary Examiner*—Timothy F. Simone
*Attorney, Agent, or Firm*—Klein and Vibber

[57] ABSTRACT

An apparatus for vacuum peeling includes a frame to which is fixed a tank with a feeding bin. A vapor spiral is mounted in the tank and beneath the tank is mounted a receiver connected by pipelines to a vacuum pump and a vacuum chamber. Over the tank, a conveyor with endless chain is mounted to the frame and on the chain are mounted disks. The lower branch of the conveyor chain is wrapped by a perforated tube that is mounted in the tank. To this perforated tube, along its length, is fixed an operational tube comprising at least four of the disks in length. Beneath the operational tube, on the side of the feeding, is placed a strainer connected with a reservoir that is connected through a pump back to the tank. In the rear end of the operational tube is fixed the vacuum chamber. Over the strainer in the lower part of the operational tube are made openings while below the manifold of the vacuum chamber are perforated second openings.

2 Claims, 3 Drawing Sheets

APPARATUS FOR VACUUM PEELING OF FRUITS AND VEGETABLES

FIELD OF THE INVENTION

The invention refers to an apparatus for vacuum peeling of fruits and vegetables that is used in the food industry.

BACKGROUND OF THE INVENTION

U.S. Pat. No. 4,026,203, which is incorporated herein by reference, discloses an apparatus for vacuum peeling of fruits and vegetables which comprises a frame to which is fixed a conveyor consisting of a chain with buckets mounted thereon. Over the chain, in its front part, is disposed a mobile lid that forms at a given moment with the respective bucket a closed vacuum chamber. A vacuum cock is mounted on the mobile lid and, by means of a flexible coupling, connects the lid to a receiver and a vacuum pump. An air cock is also mounted on the lid and immediately near it is fixed a vacuum meter. Over the front part of the conveyor, outside of it, is disposed a drum heater containing a tank in the lower end of which is mounted a vapor spiral. To the frame of the tank is seated a freely rotating drum that is separated in sectors by radially disposed perforated blades. The drum heater is connected to the conveyor by an inclined chute.

A drawback of the known apparatus is its complicated design and, as a result of the separation of the technological operations in the drum heater and the conveyor and the long duration of the technological process, the formation of a large amount of waste products during the peeling. Moreover, the prolonged mechanical shifting of the fruits and vegetables in the drum heater and the conveyor leads to their damaging.

An object of the present invention is to provide an apparatus for vacuum peeling of fruits and vegetables having a simplified construction and permitting a reduction in the period of vapor treatment and thus ensuring the production of high quality peeled fruits and vegetables. The process of cleaning is intensified while conserving the flavor and the nutritive qualities of the cleaned fruits and vegetables. As a result, there is a complete and reliable cleaning of fruits and vegetables of arbitrary shape, and a reduction in the losses of dry substance in maintaining a stable vacuum.

SUMMARY OF THE INVENTION

The present invention comprises a frame to which a tank with feeding bin is fixed. A vapor spiral is mounted in the tank. Beneath the tank is mounted a receiver connected through a fourth pipeline with a vacuum pump and through a third pipeline with a vacuum chamber. Over the tank, a conveyor with endless chain is fixed to the frame. According to the invention, disks are mounted on the endless chain of the conveyor and the lower branch of the chain is embraced by a perforated tube that is mounted in the tank. An operational tube comprising at least four disks in length is fixed to one end of the perforated tube. Beneath the operational tube, and in its front end, on the side of the feeding of the raw materials, is placed a strainer connected through a first pipeline with a reservoir that is connected to a pump. The pump is connected through a second pipeline to the tank, while in the rear end of the operational tube is fixed the vacuum chamber. Over the strainer, in the lower part of the operational tube are openings, while beneath the manifold of the vacuum chamber are perforated second openings.

The advantages of the apparatus according to this invention include: a simplified design ensuring a good qualityh peeling of the raw material; an intensification of the cleaning process while maintaining the flavor and the nutritive properties of the cleaned fruits and vegetables; reduction in the loss of dry substance.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
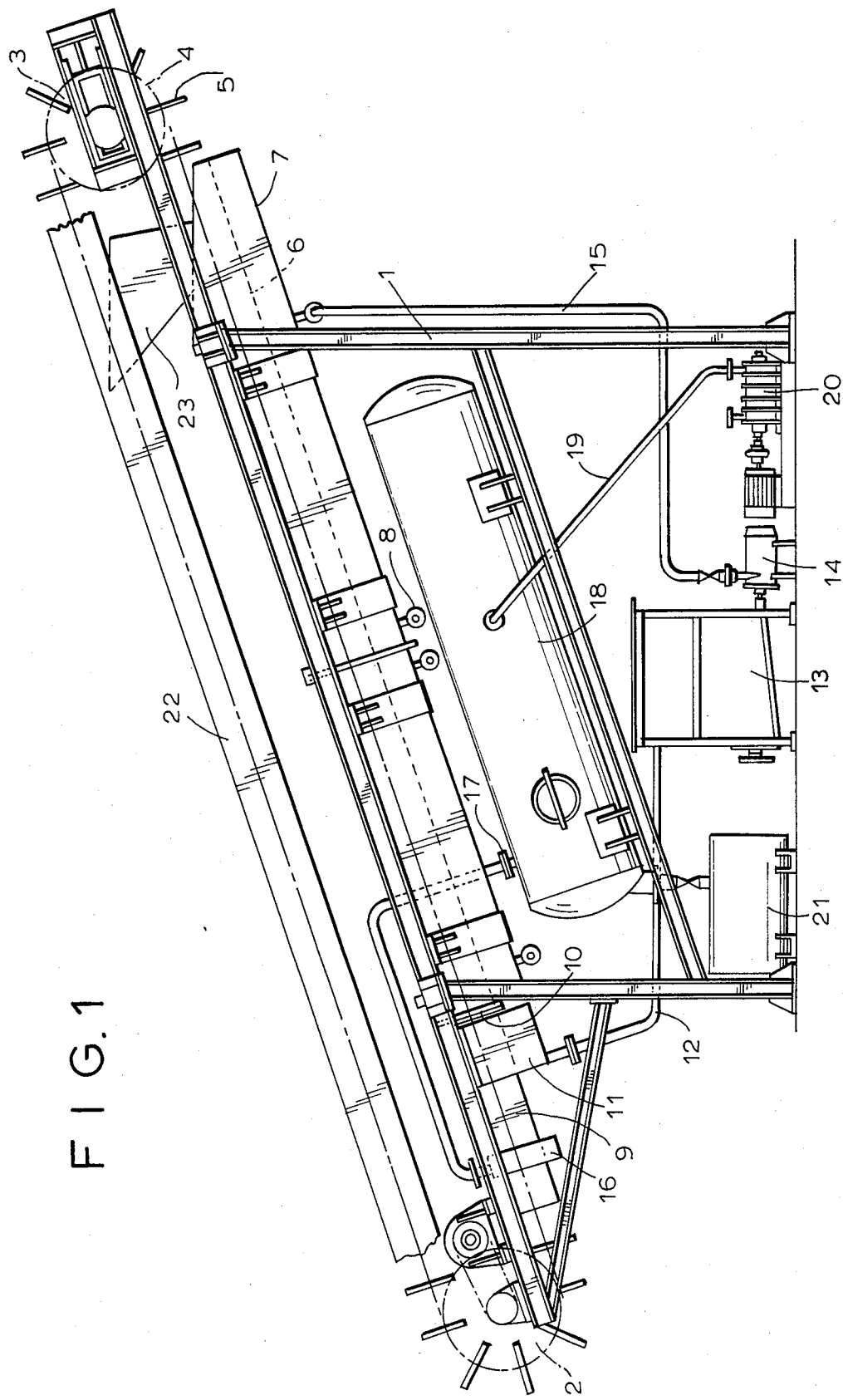
FIG. 1 is a side elevation view of the apparatus for vacuum peeling of fruits and vegetables.

Referring to FIG. 1, the apparatus for vacuum peeling of fruits and vegetables comprises a frame 1 on which are seated a conducting crown 2 and a conducted toothed crown 3 between which is stretched a chain 4 forming a conveyor. Disks 5 are mounted on the chain 4. (see also FIG. 2).

In the lower part of the chain 4 of the conveyor, the disks 5 are embraced by a perforated tube 6 mounted in a tank 7 that is fixed to the frame 1. In the tank 7 is disposed a vapor spiral 8 (see also FIGS. 2 and 3). The perforated tube 6 is connected at one end to an operational tube 9 which is mounted on tank 7 by means of a flange 10.

In the front end of the conveyor, on the feeding side of the raw materials, at the lower part of the operational tube 9, there is mounted a strainer 11 that is connected by means of a first pipeline 12 to a reservoir 13 which is connected to a pump 14. A second pipeline 15 connects the pump 14 to the tank 7.

On the rear side of the operational tube 9, there is mounted a vacuum chamber 16 (see also FIGS. 2 and 4) that is connected by a third pipeline 17 to a receiver 18 which itself is connected by a fourth pipeline 19 to a vacuum pump 20. The receiver 18 is fastened to the frame 1 over the tank 7 and is connected to a straining reservoir 21 disposed beneath it.

Over the upper part of the chain 4, a protector 22 is mounted on frame 1. In the upper part of tank 7 a feeding bin 23 is mounted.

Figure 2:
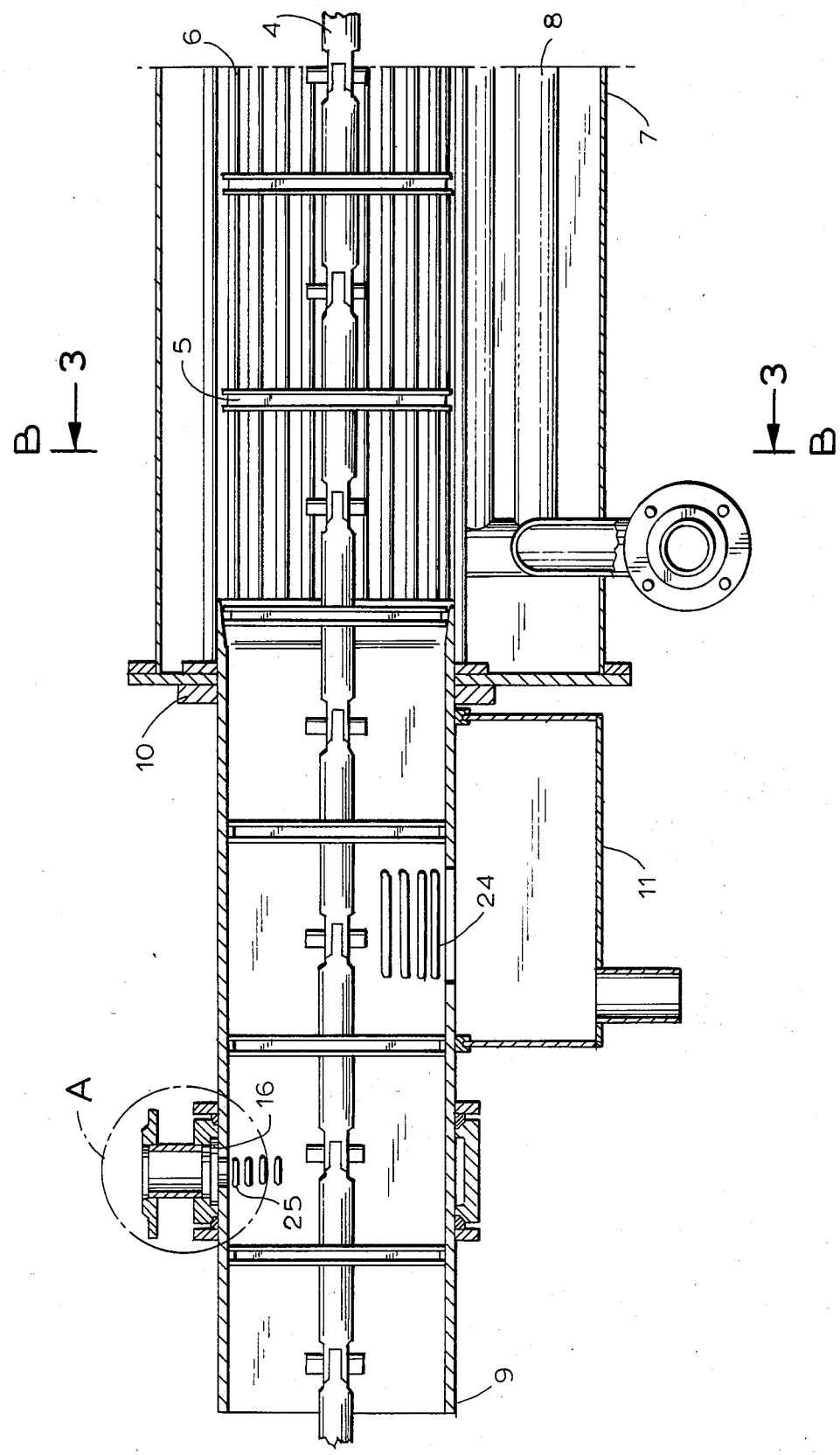
FIG. 2 is a section of the operational tube with the vauum chamber, a part of the tank for heating and the conveyor.
Figure 3:
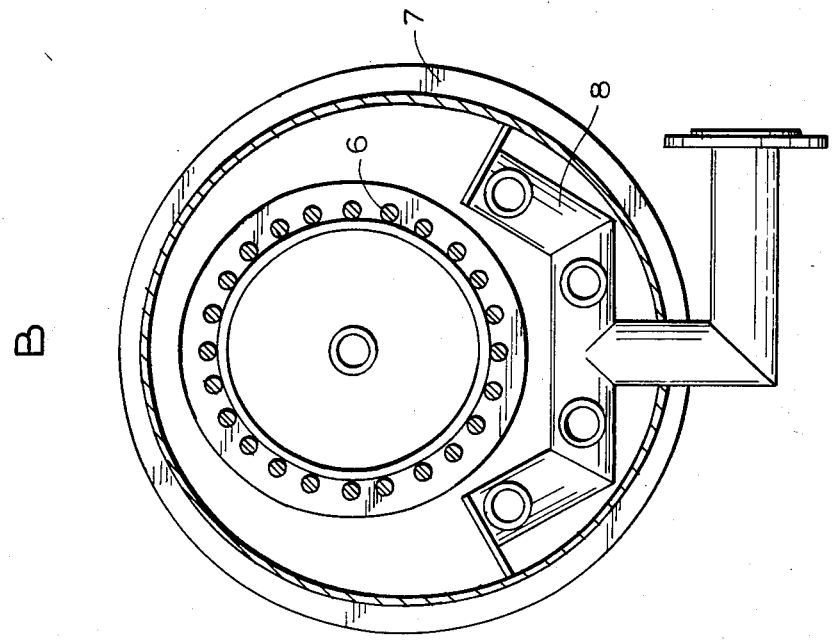
FIG. 3 is a section along B—B from FIG. 2.

Referring now to FIG. 2, four disks 5 are shown disposed in the operational tube 9. Over the strainer 11, in the lower part of operational tube 9, are cut openings 24 while, beneath the manifold of the vacuum chamber 16 in the upper part of the operational tube 9 are cut second openings 25.

Figure 4:
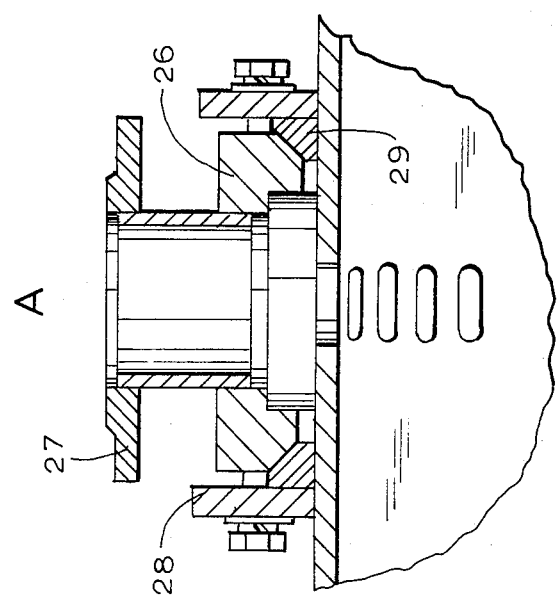
FIG. 4 is a partial section of the vacuum chamber.

As can be seen from FIG. 4, the vacuum chamber 16 comprises a case 26 to which is welded a manifolf with flange 27. The case 26 is fastened by bolts with pressing rings and a sealing 29 is disposed between the case 26 and the operational tube 9.

The apparatus operates as follows: The tank 7 is filled with water that is heated to 80 to 100 degrees C. by the vapor spiral 8. After attaining the required temperature, vacuum pump 20 is activated and the receiver 18 is evacuated to a vacuum of 650 to 700 mmHg. The chain drive is then activated and the chain 4 along with the disks 5 passes through the perforated tube 6 which is embraced by the heated water in tank 7 in the operational tube 9. The fruits (or vegetables) enter through the feeding bin 23 in the tank 7 and move through the perforated tube 6 by means of chain 4 and disks 5. During their movement, the fruits or vegetables are heated to a determined temperature. In leaving the perforated tube 6, the fruits arrive in the front part of operational tube 9. The hot water carried off jointly with the fruits is strained in the strainer 11 and through the first pipeline 12 into reservoir 13 from where it returns by means of pump 14 and second pipeline 15 to the tank 7. The fruits are moved to vacuum chamber 16 where, as a result of the existing vacuum, the skin is separated from the fruit. The peeled fruits leave the apparatus at the end of operational tube 9.

Although the invention is described and illustrated with reference to a single embodiment thereof, it is to be expressly understood that it is in no way limited to the disclosure of such preferred embodiment but is capable of numerous modifications within the scope of this appended claims.

We claim:

1. An apparatus for vacuum peeling of fruits and vegetables comprising
    a frame and a water carrying longitudinal tank fastened to said frame;
    a perforated tube mounted inside said tank;
    a vapor spiral mounted inside said tank and outside said perforated tube for heating water inside of said tank;
    a feeding bin attached to one end of said tank for receiving unpeeled fruits or vegetables for delivery into said perforated tube inside said tank;
    a receiver mounted on said frame below said tank and a vacuum pump connected to said receiver by a fourth pipeline;
    an operational tube connected to said perforated tube at an end of said perforated tube farthest from said feeding bin;
    a vacuum chamber mounted in said operational tube and connected to said receiver by a third pipeline;
    a strainer mounted beneath said operational tube, said strainer being located between said vacuum chamber and said perforated tube;
    a resevoir and a pump, said resevoir being connected to said strainer by a first pipeline, said pump connecting said reservoir to said tank by a second pipeline;
    an endless conveyor chain and a plurality of discs, said discs being mounted on said conveyor chain approximately normal thereto, said chain defining the approximate center of said discs;
    said conveyor being mounted on said frame over said tank and arranged so that said disks on said chain pass through said perforated tube and said operational tube;
    whereby unpeeled fruit or vegetables which enter said feeding bin are carried by said disks on said conveyor through said perforated tube to said operational tube, over said strainer, past said vacuum chamber and out of said operational tube.

2. An apparatus as claimed in claim 1, wherein said disks are equally spaced along said chain and said operational tube is long enough to encompass four disks; and
    wherein said operational tube is provided with openings in its lower part over said strainer and second openings in its lower part over said vacuum chamber.

* * * * *